(12) United States Patent
Ibaraki

(10) Patent No.: US 7,490,647 B2
(45) Date of Patent: Feb. 17, 2009

(54) PNEUMATIC TIRE

(75) Inventor: Daisuke Ibaraki, Osaka (JP)

(73) Assignee: Toyo Tire & Rubber Co., Ltd. (JP)

( * ) Notice: Subject to any disclaimer, the term of this patent is extended or adjusted under 35 U.S.C. 154(b) by 115 days.

(21) Appl. No.: 11/370,563

(22) Filed: Mar. 8, 2006

(65) Prior Publication Data

US 2006/0278318 A1 Dec. 14, 2006

(30) Foreign Application Priority Data

Jun. 10, 2005 (JP) .............................. 2005-171688

(51) Int. Cl.
*B60C 13/00* (2006.01)
*B60C 13/02* (2006.01)

(52) U.S. Cl. ..................... 152/523; D12/500; D12/506; D12/534; D12/569; D12/605

(58) Field of Classification Search ............... D12/500, D12/506, 534, 535, 536, 537, 569, 570, 571, D12/572, 604, 605; 152/523

See application file for complete search history.

(56) References Cited

U.S. PATENT DOCUMENTS

| D488,769 | S | * | 4/2004 | Guidry | ...................... | D12/579 |
| D497,593 | S | * | 10/2004 | Ratliff et al. | ................ | D12/605 |
| D516,016 | S | * | 2/2006 | Miyazaki et al. | ........... | D12/605 |
| D517,004 | S | * | 3/2006 | Miyazaki et al. | ........... | D12/605 |
| D521,444 | S | * | 5/2006 | Miyazaki et al. | ........... | D12/605 |
| D531,110 | S | * | 10/2006 | Miyazaki et al. | ........... | D12/579 |
| D539,214 | S | * | 3/2007 | Miyazaki | ................... | D12/605 |
| D541,212 | S | * | 4/2007 | Smith et al. | ................ | D12/605 |

FOREIGN PATENT DOCUMENTS

| JP | 01153307 | * | 6/1989 |
| JP | 641181 A | | 6/1994 |
| JP | 8-282215 A | | 10/1996 |

* cited by examiner

*Primary Examiner*—Justin Fischer
(74) *Attorney, Agent, or Firm*—The Webb Law Firm

(57) ABSTRACT

A pneumatic tire provided with a plural of non-linear ridges 11 in a side wall region, wherein ridges 11 are composed of two or more non-linear ridge groups with different shapes and at least one ridge extends from a rim line R to H 80 which is a position corresponding to 0.8 H when tire height from a rim line to a tire maximum outside diameter is defined as H.

6 Claims, 2 Drawing Sheets

PNEUMATIC TIRE

The description of this application claims benefit of priority based on Japanese Patent Application No. 2005-171688, the entire same contents of which are incorporated by reference herein.

BACKGROUND OF THE INVENTION

1. Field of the Invention

The present invention relates to a pneumatic tire and in more detail, the present invention relates to prevention of bare generation in a side wall region and improvement in appearance quality.

2. Description of the Prior Art

In a pneumatic tire, a side wall forms a smooth curved surface except display of brand names, tire size, and land parts. Since a part which molds said curved surface of a mold is not provided with a concave portion, at the time of vulcanizing and molding a green tire, air is likely to be entrapped between a tire and a mold and further, air is hard to be exhausted. As a result, molding inferiority called bare is likely to be generated in an air entrapped portion.

As one of the countermeasures for preventing bare generation, multiple of air-exhaustion holes called vent holes may be provided with a mold. However, when this method is employed, productivity is lowered since it requires an operation (trimming) in which vent spews that are formed with vent holes are cut after vulcanizing and molding.

In order to solve such a problem, a pneumatic tire is known in which linear projected lines called ridges are provided in the wide range of a side wall (FIGS. 1 to 6 of Japanese Patent Laid-Open Publication No. 8-282215) at an equal interval (for example, not greater than 5 mm).

However, in the above mentioned pneumatic tire, multiple of fine grooves are to be cut on a mold for the formation of a ridge, and there has been a problem of increased production cost of the mold. In addition, since an interval between ridges is small, when dirt is deposited on a side wall, dirt is more elicitable here than other portions, which has also been a problem. Further, since dirt is hard to remove, it has been a problem for users as well.

A side wall is also a portion where joints on which a plurality of rubber members constitute a tire overlap are exposed. In the vicinity joints, as a matter of consequence, subtle concavities and convexities may be formed. For this reason, when linear ridges are regularly arranged, by this subtle concavities and convexities, ridges are deformed, thereby causing a problem of degraded appearance quality.

The object of the present invention lies in prevention of bare generation at the time of vulcanizing and molding, and in improvement in appearance quality by inhibiting the elicitation of concavities and convexities in the vicinity of joints of rubber members on a side wall surface.

SUMMARY OF THE INVENTION

The invention of the present application relates to a pneumatic tire provided with a plurality of non-linear ridges, wherein said ridges are composed of two or more non-linear ridge groups with mutually different shapes. By composing ridges of two or more non-linear ridge groups with different shapes instead of same shapes, the deformation of ridges is not elicitable even when a side wall has subtle concavities and convexities, and therefore, appearance quality improves. Further, dirt is unlikely to deposit between ridges by making intervals of adjacent ridges irregular instead of making them constant.

In the present invention, the concept of non-linear ridges includes not only curved line ridges with shapes of curved lines but also polygonal line ridges with shapes of polygonal lines composed of a plurality of segments.

The present invention has characteristics in that when tire height from a rim line to a tire maximum outside diameter is defined as H, one of said ridges extends from said rim line to the position of 0.8H from said rim line.

By providing ridges at least from a rim line to the position of 0.8H from the rim line, grooves which mold ridges are formed in a wide range of a mold, and therefore, air entrapped in the mold can effectively be exhausted. In addition, the number of vent holes can be decreased, which shortens trimming operations and productive efficiency improves. Further, since ridges are non-linear, ridges can be arranged long, thereby capable of exhausting more air.

The present invention has characteristics in that said ridges are non-linear ridges which include wave form portions. By including wave form portions, ridges can further be arranged longer and air entrapped in a mold can be exhausted further more effectively.

The present invention has characteristics in that said ridges are connected to a land part. By connecting the ridges and the land part, in a mold which vulcanizes and molds a tire, a concave portion molding a land part and a groove molding ridges are connected. As a result, exhaustion of air in a mold is further preferably exhausted, thereby capable of preventing bare generation.

The present invention has characteristics in that said ridges include a pair of ridges in which the minimum distance of adjacent ridges is 5 mm to 50 mm. By providing such a pair of ridges, deposition of dirt is inhibited between ridges without lowering ridge density.

The present invention has characteristics in that vent spews are formed in said ridges. In drilling vent holes, by synergy effect with grooves cut in a mold, air can be exhausted more effectively than when vent holes alone are used.

The present invention has characteristics in that said ridges include a plurality of ridge groups branched from the branching point. Since ridges are branched, grooves which mold the ridges are connected and air in the mold can effectively be exhausted.

The present invention has characteristics in that vent spews are formed in said branching points. By drilling vent holes on positions corresponding to branching points of a mold, the number of vent holes can be decreased, while air is effectively exhausted.

The present invention has characteristics in that the shapes of said ridges are similar to contours of a land part. By making ridge shapes and contours of a land part similar, such effect is shown that both ridges and a land part are integrated from the view point of design. For information, a part of a ridge and a contour of a land part may be similar. Regarding similarity, similarity in shapes of pattern development or similarity of shapes viewed from a specific direction (for example, a shape viewed from a tire side face) is enough.

DESCRIPTION OF THE PREFERRED EMBODIMENTS

An embodiment of a pneumatic tire according to the present invention will now be explained on the basis of the drawings.

Figure 1:
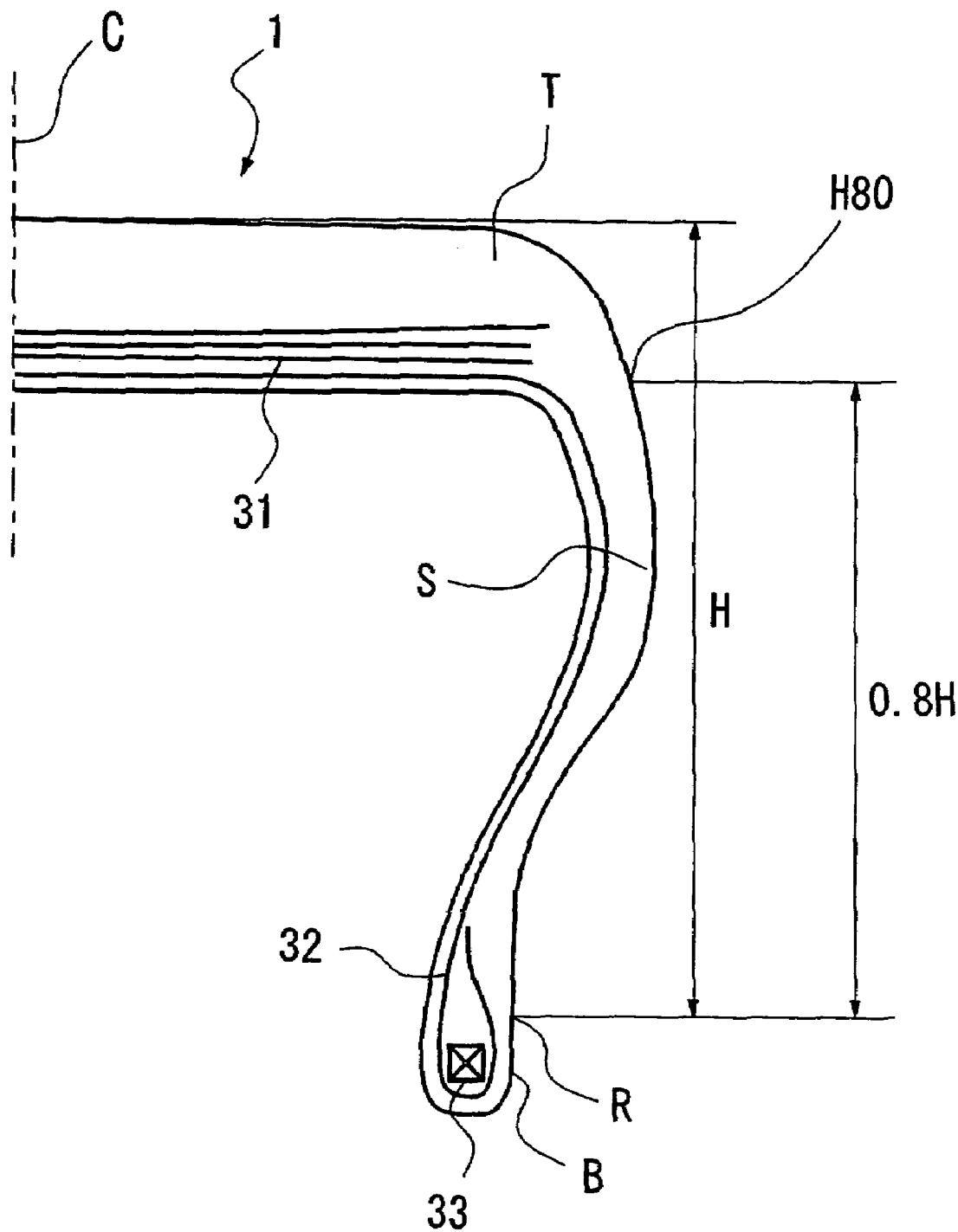
FIG. 1 is a half-section view of a pneumatic tire related to the present invention.

FIG. 1 is a half-section view of a pneumatic tire.

The pneumatic tire 1 comprises a bead portion B which includes bead core 33 wound by a carcass 32, a side wall portion S which is connected to the bead portion B and forms a troidal shape, and a tread portion T which is reinforced by belt layers 31. This structure is a publicly known structure of a pneumatic tire. For information, FIG. 1 shows a tire structure, and grooves, land portion, ridges, and the like are not illustrated therein.

Tire height H is defined as a distance from a rim line R to the position of a tire maximum outside diameter (an intersection of a tire equator line C and a tread surface). At least one ridge extends within the range from a rim line R to the position of 80% of the tire height H (H 80). Hereinafter, explanation is made on ridges.

Figure 2:
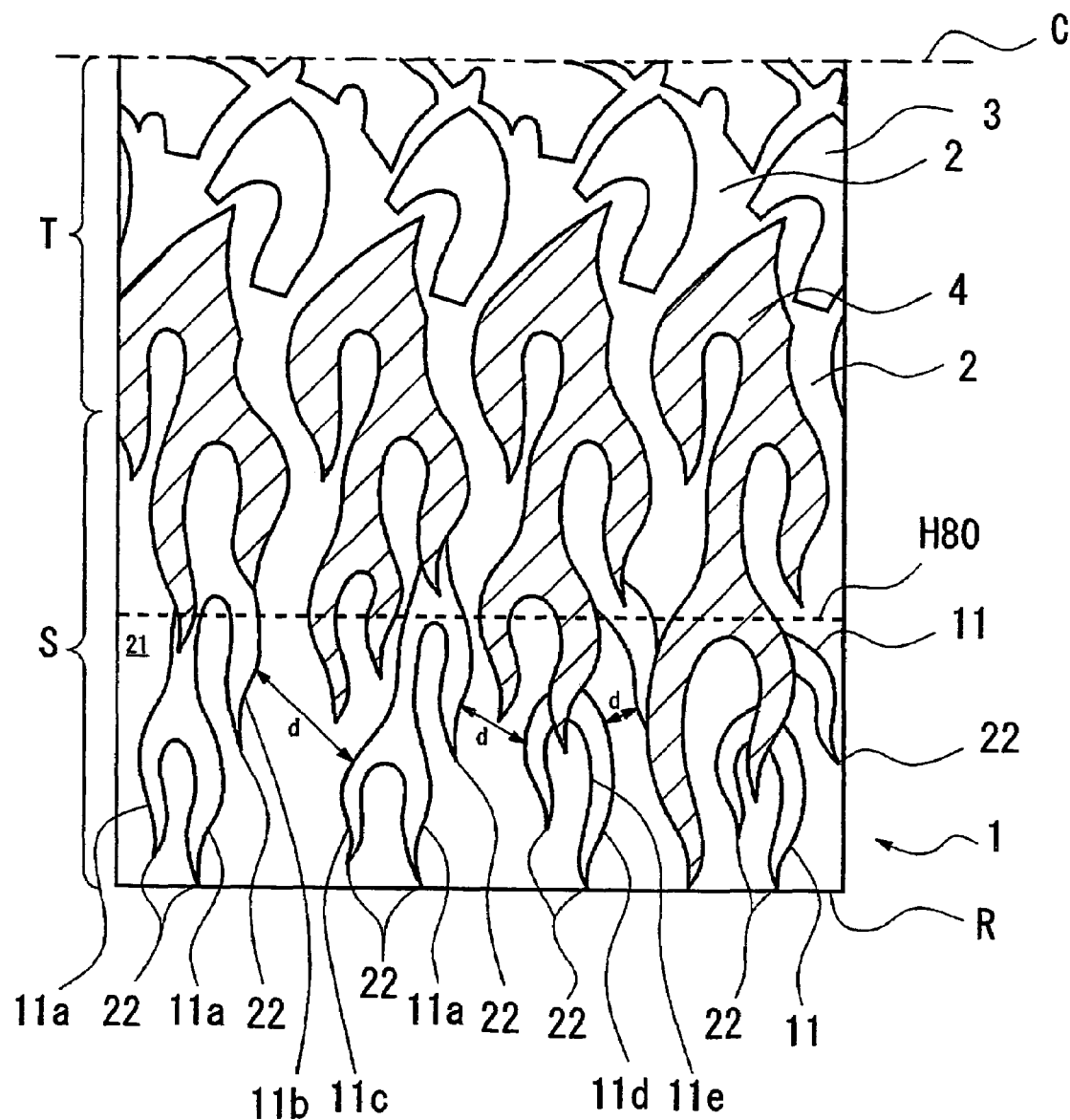
FIG. 2 is a part-developed view showing a tread and a side wall.

FIG. 2 is a part-developed view showing a tread and a side wall. In a tread portion T, many grooves 2 are cut and blocks 3 and 4 are formed. The block 4 in a shoulder portion of the tread extends to the side wall portion S. The reason that the block 4 extends to the side wall portion S is for reinforcing a side wall. By this, durability and steering stability of a tire is improved.

As blocks 4 approach a bead side (a lower part in the figure), height thereof is gradually lowered. For information, in order to distinguish from a ridge 11, there is a hatched portion in the block 4.

On a side wall portion 21, many ridges 11 are arranged. The ridges are non-linear ridges and they do not have the same shapes and are composed of two or more non-linear ridge groups with different shapes. Further, intervals between ridges are irregular. As a result, the deformation of ridges 11 is not elicitable even with subtle concavities and convexities of a side wall and therefore, appearance quality is not degraded.

Air exhaustion at the time of vulcanizing and molding is promoted by grooves of a mold which molds ridges 11. Further, since at least one ridge (for example, 11a and 11c) extends within the range from H 20 to H 80, air can be exhausted more effectively and bare generation is prevented.

Since ridges 11 are non-linear, they are longer than linear ridges. As a result, air exhaustion amount increases and bare generation is prevented. In particular, by including wave form portions, length of ridges 11 can be taken long, thereby further improving bare prevention effect.

Therefore, since air is exhausted by the grooves of a mold which molds ridges, the number of vent holes can be decreased. It is less expensive when grooves are cut in a mold than when vent holes are drilled, manufacturing cost of a mold gets lower. In addition, trimming operations are shortened and productive efficiency improves.

Further, it is preferable that ridge groups (for example, 11 d and 11 e) with a plural of ridges branched from a branching point 22 constitute the structure. Grooves which mold ridges 11 are connected and air in the mold can be exhausted effectively. Further, by providing vent holes on the position which corresponds to the branching points 22 of a mold, the number of vent holes can further be decreased.

By connecting the block 4 and the ridge 11, in a mold which vulcanizes and molds a tire, a concave portion (not illustrated in a figure) which molds the block 4 and a groove (not illustrated in a figure) which molds the ridge 11 are connected. As a result, the air in the mold can further preferably exhausted and bare generation can be prevented.

Since intervals of adjacent ridges are not constant but are irregular, dirt is unlikely to deposit between ridges 11. For information, from the view point of inhibiting dirt deposition, it is preferable that a pair of ridges (for example, 11 b and 11 c) are provided in which the shortest distance d between adjacent ridges is 5 mm to 50 mm.

As mentioned above, examples of curved line ridges were illustrated in which ridges have curved shapes. When ridges are non-linear, same effect can be obtained and therefore, ridges may be composed of polygonal line ridges with shapes of polygonal lines composed of a plurality of segments, or curved line ridges and polygonal line ridges may be present together.

It is preferable that height of ridges is 0.3 mm to 1.5 mm. When the height is less than 0.3 mm, exhaustion effect of the air is little. On the other hand, when the height exceeds 1.5 mm, trouble due to too much rubber volume or due to too much elicitation is likely to happen.

EXAMPLE

Tires related to Example and Conventional Examples were manufactured and the performance thereof was evaluated. The detail of the Example and the Conventional Examples is a tire as shown below.

Tire size: LT285/70R17 all

Example: Ridges shown in FIG. 2 are provided. Height of the ridges is 1.0 mm.

Conventional Example 1: No ridge is provided.

Conventional Example 2: Ridges at intervals of 1 mm extending in the radial direction from a rim line R to a position of 80% of tire height H are provided. Height of the ridges is 1.0 mm.

Conventional Example 3: Ridges at intervals of 1 mm extending in the radial direction from a rim line R to a position of 35% to 65% of tire height H are provided. Height of the ridges is 1.0 mm.

Evaluation result is shown in Table 1. Bare generation rate is a value which shows poor manufacture rate at the time of vulcanizing and molding. Appearance quality is a value based on sensory evaluation of whether concavities and convexities of a side wall are elicitable or not. Dirt resistance is a value based on visual evaluation of dirt on a side wall after driving a truck for 12000 km with tires attached thereto with a rim (17×9.5JJ) and air pressure of 450 kPa. All the values are indexes when the values of Conventional Example 1 are taken as 100, and the larger value shows the higher evaluation.

TABLE 1

|  | Example | Conventional Example 1 | Conventional Example 2 | Conventional Example 3 |
|---|---|---|---|---|
| Bare generation rate | 120 | 100 | 120 | 110 |
| Appearance quality | 120 | 100 | 110 | 105 |
| Dirt resistance | 100 | 100 | 80 | 95 |

According to Table 1, a pneumatic tire of the present invention could lower bare generation rate in comparison to that of Conventional Example 1 and further, a pneumatic tire of the present invention could improve appearance quality and dirt resistance.

What is claimed is:

1. A pneumatic tire provided with a plurality of non-linear ridges on a side wall region, wherein said ridges are composed of two or more non-linear ridge groups with different shapes and said ridges include a plurality of ridge groups branched from a branching point and vent spews are formed on said branching points.

2. The pneumatic tire as set forth in claim 1, wherein at least one ridge extends from a rim line to a position of 0.8 H when tire height from a rim line to a tire maximum outside diameter is defined as H.

3. The pneumatic tire as set forth in claim 1, wherein said ridges are non-linear ridges which include wave form portions.

4. The pneumatic tire as set forth in claim 1, wherein said ridges are connected to a land portion.

5. The pneumatic tire as set forth in claim 1, wherein said ridges include a pair of ridges in which the shortest distance between adjacent ridges is 5 mm to 50 mm.

6. The pneumatic tire as set forth in claim 4 wherein shapes of said ridges are similar to contour lines of said land portion.

* * * * *